I. J. PLOUGHE.
BROODER.
APPLICATION FILED APR. 15, 1911.

1,009,567.

Patented Nov. 21, 1911.

3 SHEETS—SHEET 1.

WITNESSES

INVENTOR

Attorney

COLUMBIA PLANOGRAPH CO., WASHINGTON, D. C.

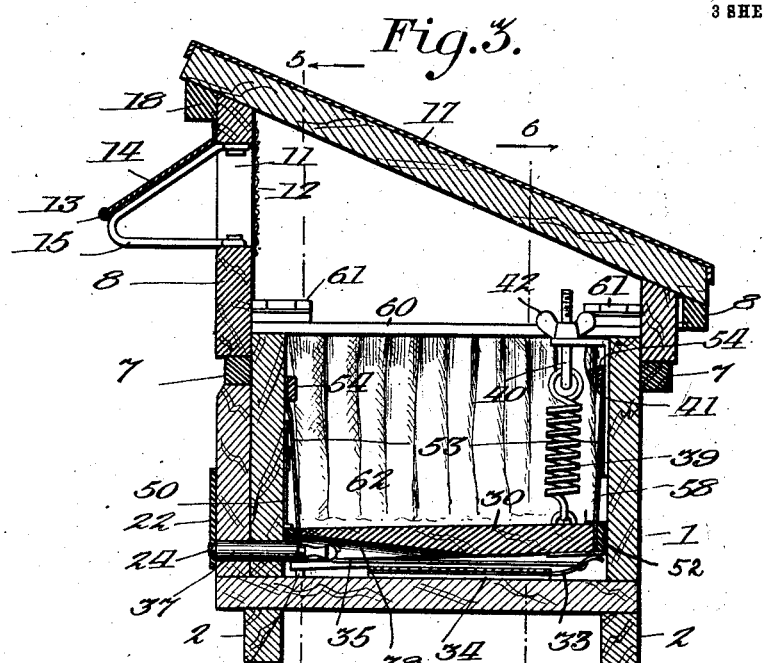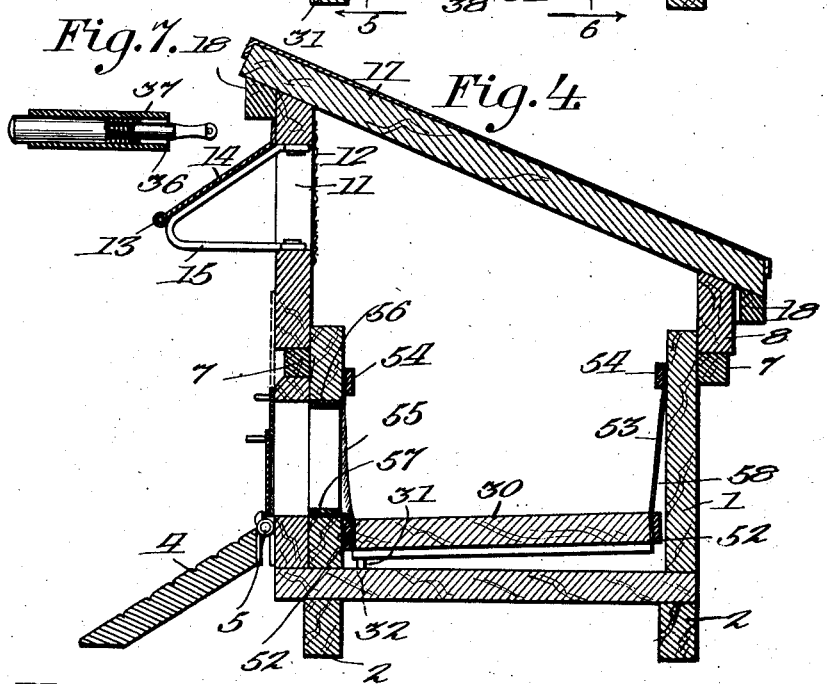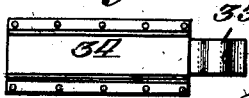

I. J. PLOUGHE.
BROODER.
APPLICATION FILED APR. 15, 1911.

1,009,567.

Patented Nov. 21, 1911.

3 SHEETS—SHEET 3.

Witnesses
Philip E. Barnes

Inventor
I. J. Ploughe
by James Shuly &Co. Attys.

UNITED STATES PATENT OFFICE.

ISAAC J. PLOUGHE, OF PLAINVILLE, ILLINOIS, ASSIGNOR OF ONE-HALF TO JOHN W. KUHLMAN, OF HULL, ILLINOIS.

BROODER.

1,009,567.  Specification of Letters Patent.  Patented Nov. 21, 1911.

Application filed April 15, 1911. Serial No. 621,406.

*To all whom it may concern:*

Be it known that I, ISAAC J. PLOUGHE, citizen of the United States, residing at Plainville, in the county of Adams and State of Illinois, have invented new and useful Improvements in Brooders, of which the following is a specification.

My present invention has to do with poultry culture, and more particularly with combined coops and brooders for young chickens; and it has for its general object to provide a device, of the character stated, that is calculated to exclude more than a predetermined number of young chickens with a view to giving them wider range, and preventing crowding and suffocation of the chickens in the device when they return from range to coop, and this by reliable means and in such manner that there is no liability of any one of the chickens being injured incidental to the operation of said means.

A further object of the invention is the provision of a combined coop and brooder in which a soft lining is employed to serve the two-fold purpose of forming a dead-air space, that renders the device warm, and preventing dirt and litter from interfering with the operation of the means for excluding more than a predetermined number of young chickens.

Another object is the provision in a device of the kind stated, of a hover constructed in such manner as to permit the free descent of pure air and ascent of warm and vitiated air, and this without subjecting the chicks to drafts.

Figure 1:
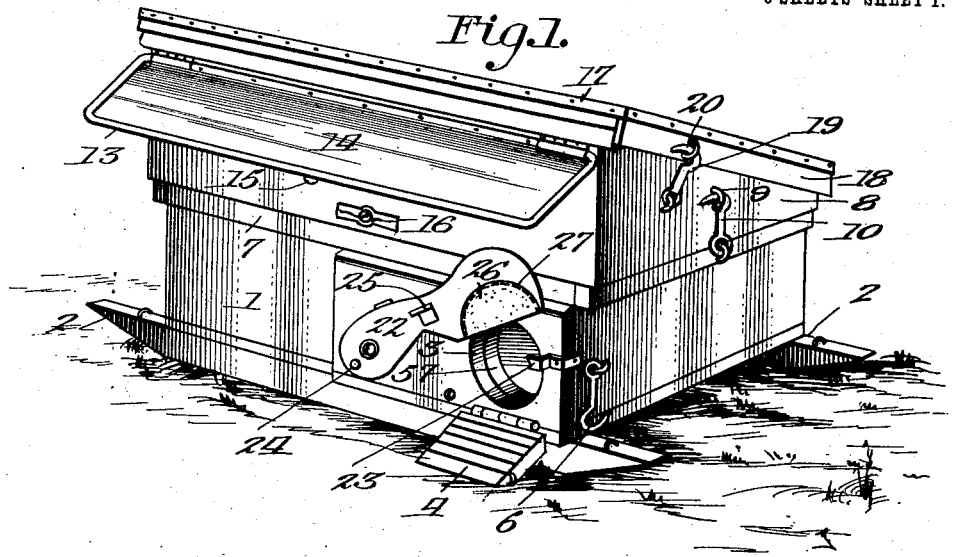
Figure 2:
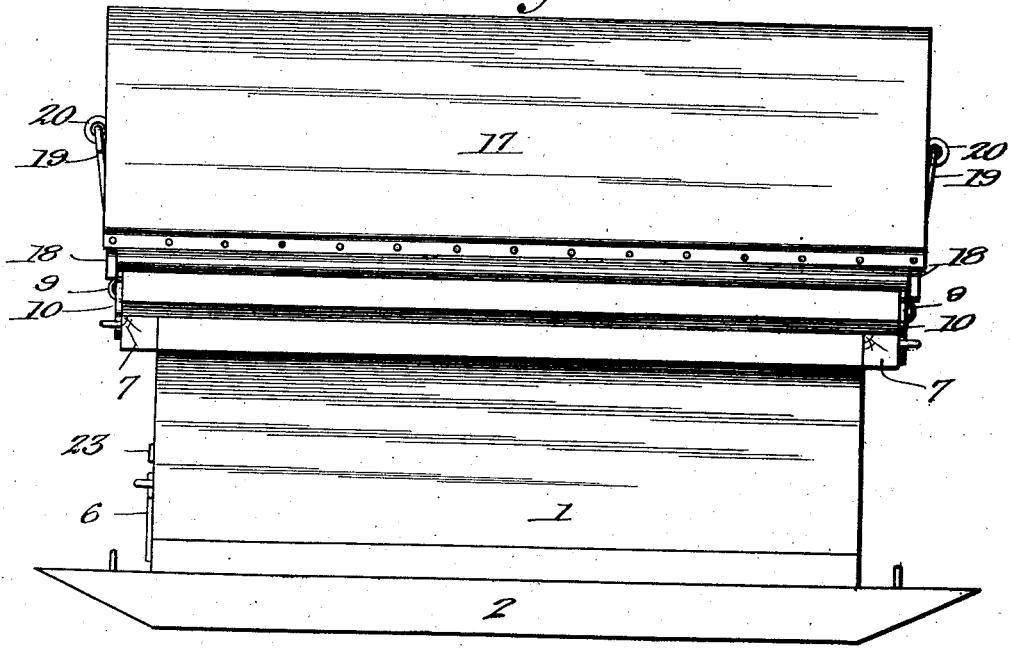
Figure 5:
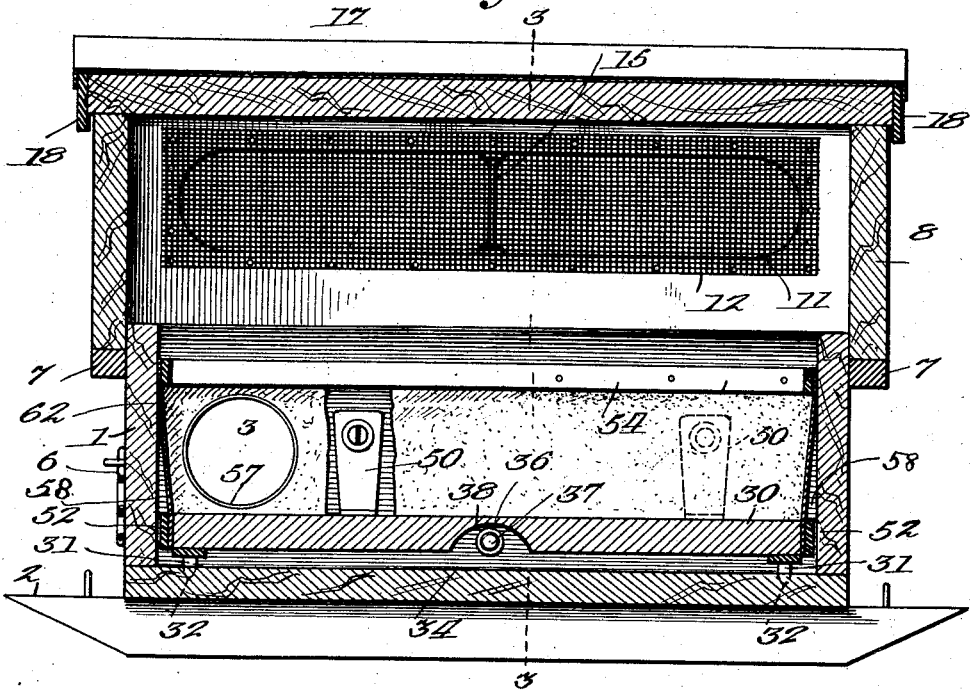
Figure 6:
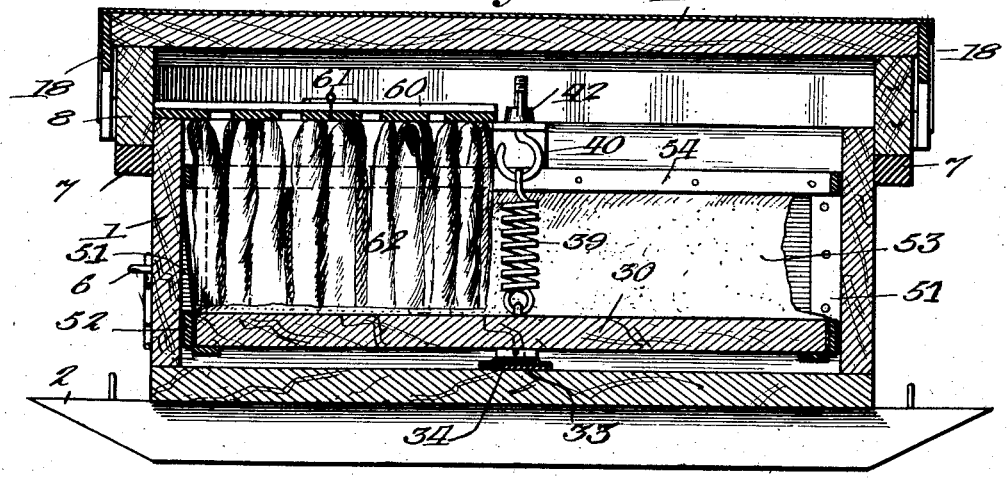

Other objects of the invention will be fully understood from the following description and claims when the same are read in connection with the drawings, accompanying and forming part of this specification, in which:

Figure 1 is a perspective view illustrating the device constituting the best practical embodiment of my invention that I have as yet devised as the same appears when ready for the entry of chicks. Fig. 2 is an enlarged rear elevation of the same. Fig. 3 is a transverse section taken in the plane indicated by the line 3—3 of Fig. 5, looking in the direction of the arrow. Fig. 4 is a transverse section taken through the entrance opening and showing the door in its closed position. Figs. 5 and 6 are longitudinal sections, partly broken away, taken on the lines 5—5 and 6—6, respectively, of Fig. 3. Fig. 7 is a detail view of the combined fastener and brake that coöperates with the gravitating door. Fig. 8 is a detail plan showing the spring strip through which the said fastener and brake is retracted and also showing the housing in which said strip is arranged.

Similar numerals designate corresponding parts in all of the views of the drawings, referring to which: 1 is the body of the coop which is preferably, though not necessarily, mounted on runners 2 to permit of it being readily moved from place to place in a chicken yard. In its front wall and near one end said body 1 is provided with an entrance opening 3, and below the said opening 3 a stepped section 4 is hinged at 5; said section 4 being adapted when desired to be swung up to a position in front of the opening 3 and to be secured in such position by the hook 6, Figs. 1 and 2. On its outer side and at a slight distance below its upper edge the body 1 is provided with an exterior ledge 7, and on the said ledge 7 is removably arranged an open frame 8 having front, back and side walls; said frame 8 being provided on its ends with eyes 9 for the engagement of hooks 10 through the medium of which it is detachably secured on the body 1. In its front wall the frame 8 is provided with an opening 11 for the circulation of air and to admit sunshine, and at the inner side of said opening is fixed a screen 12 of reticulated material, designed to exclude insects, vermin, etc. Hinged to the front wall of frame 8, above the opening 11, is an awning composed of a frame 13 and suitable textile material 14, and hinged in the opening 11 is a horizontally swinging awning support 15 that is adapted in the extended position, Figs. 3 and 4, to maintain the awning in an open position so as to permit the free circulation of air and sunshine through the opening while shading the same from the weather. When the said support 15 is swung to a position entirely within the opening 11, the awning may be swung flat against the back wall of the frame 8 and secured by the turnbuckle 16, Fig. 1. In the latter position the awning will exclude drafts and yet will permit the circulation through opening 11 of sufficient air to maintain a wholesome atmosphere in the device.

On the frame 8 is removably arranged the top 17. This top 17 is provided at its underside with cleats 18, and hence it is not liable to be blown off even when the hooks 19 on the frame 8 are disengaged from its eyes 20. Said top 17 obviously can be raised slightly at either the hover end or the feed end of the device, and slid in either direction or removed instantly for cleaning.

Pivoted at 21 to the front wall of the body 1 of the device is the gravitating door 22, preferably of metal, and fixed to the body 1, at the opposite side of the entrance opening 3 with reference to the pivot point 21 of the door, is a keeper 23 which has for its office to retain the closed door against the body 1 and prevent lateral pressing of the door outward or away from the entrance opening 3. The door 22 is provided at 24 with a transverse opening and at 25 with a finger-piece, and the lower portion of its forward arm is cut away, preferably in the form shown, to receive a section 26, of felt, cloth or other soft material, which has for its office to prevent the door when it descends from hurting chicks. The section 26 may be secured to the door by stitches 27 passed through apertures in the door or by any other suitable means.

Arranged above the bottom of the body 1 is a false bottom 30, preferably of wood, which is provided near its forward corners with depending pins 31. These pins are seated in shallow sockets 32 in the body bottom, Figs. 4 and 6, and serve to prevent slipping or casual edgewise movement of the false bottom without interfering with vertical movement of the rear portion thereof. The said rear portion of the false bottom 30 rests on the rear upwardly-directed portion of a spring strip 33, the forward and major portion of which is secured in a housing 34, Figs. 3, 5 and 8, on the body bottom, and hence when the rear portion of the false bottom is depressed the rear portion of strip 33 will be depressed, while when the rear portion of the false bottom is moved upward, the strip portion, by reason of its resiliency, will follow the upward movement of the bottom portion. Connected at one end to the rear portion of the strip 33 is a wire 35 which constitutes the preferred connection between said strip and the combined door fastener and brake. This door fastener and brake is in the form of a spring-backed pin 36, housed in a sleeve 37 that extends transversely through the front wall of the body 1. Said pin is designed to rest in the aperture 24 of door 22 and retain said door in the full-open position, Figs. 1 and 3, and it is also designed after being retracted from the aperture 24 to yieldingly press against the inner side of the door and thereby retard the descent of the forward arm thereof. The underside of the false-bottom 30 is recessed at 38, Figs. 3 and 6, to accommodate the pin 36, its housing 37 and the connection 35, and the rear portion of said false-bottom is yieldingly supported by a coiled spring 39, Figs. 3 and 5, that is connected to and extends upward therefrom, and is connected at its upper end to a bolt 40. This bolt 40 extends loosely through a bracket 41 fixed on the back wall of the body 1 and is equipped above said bracket with a wing-nut 42. By adjusting the spring 39 through the medium of the wing-nut 42, the weight required to depress the false bottom 30 and bring about the closure of the door 22 may be regulated. In other words, by said adjustment the capacity of the device may be predetermined, and when said capacity is attained—i. e., the proper number of chicks have entered the device, the door will be fully closed to prevent crowding of chicks in the device and the evils attendant thereon.

It will be gathered from the foregoing that the door 22, as shown in Fig. 1, is always ready and has only a pressure down corresponding to its own weight; also, the door is released gradually, as the weight of one chick after another is imposed on the false bottom 30, and that after the pin 36 is retracted from the aperture 24, the pressure of the pin against the inner side of the door causes the door to close very slowly— i. e., a little incidental to the entrance of each chick, until the pressure of the pin is removed from the door when the door completes its closing movement.

The forward portion of the false-bottom 30 bears upward against removable stops 50 on the front wall of the body 1, Figs. 3 and 6, and the rear portion of said false-bottom bears upward against stops or blocks 51 fixed in the rear corners of body 1, Fig. 5.

Held by binding strips 52 to the edges of the false-bottom 30 is a lining 53 of soft cloth or other material compatible with its purpose, which lining has its upper portion interposed between binding strips 54 and the walls of the body 1, as clearly shown in Figs. 3 to 6. It will also be seen by comparison of Figs. 1, 4 and 6, that the front portion of the lining 53 is provided opposite the entrance opening 3 of the body 1 with an opening 55, which opening 55 is surrounded by an outwardly-extending circular cloth portion 56, suitably attached to and forming part of the lining 53. The said portion 56 is disposed in the entrance opening 3 of the body and is detachably held therein by a removable, open frame 57, which is preferably in the form of a ring, Figs. 1 and 4. It will thus be manifest that when occasion demands, the lining 53 may be expeditiously and easily removed from the body 1, and may as readily be replaced with a new lining. The lining 53 in addition to rendering the interior of the device warm and soft to the chicks, serves to form a dead air space 58, and also serves to prevent dirt, litter, etc., from getting below and interfering with the operation of the false-bottom 30 or the mechanism connected therewith. This latter is due in large measure to the arrangement of the lining relative to the entrance opening 3, and it will also be here noted that the entrance opening 3 being located near one end of the body 1 and the door 22 being on the outside of said body, there is no liability of drafts entering the hover which, as will be hereinafter explained, is located in the opposite end portion of body 1. The dead-air spaces formed between the lining 53 and the upright walls of the body 1 and between the false-bottom 30 and the body bottom, contribute materially to making the interior of the device warm and comfortable at all times.

The hover hereinbefore referred to is removably arranged in the end portion of the body 1 remote from the entrance opening 3, as shown in Figs. 3 and 5. It comprises two frame sections each of which has a plurality of slats 60 separated by intervening spaces to enable pure air to pass downward and vitiated air to pass upward through the frame, a hinge connection 61 between said frame sections, and strips 62 of cloth or other suitable material depending from the frame sections. The adaptability of the hover to be folded permits of the space in the coop being increased, as on a rainy day, and also permits of the chicks being conveniently inspected. Also when desired, the hover as a whole may be quickly and easily lifted out of the coop.

It will be gathered from the foregoing that by adjusting the spring 39 the capacity of the device can be predetermined. Consequently after the device is once set it does its own separating. Then as the chicks grow in weight and require more room, the door closes sooner and sends the chicks that would crowd the device shown to another coop of similar construction, placed alongside.

When it is desired to use the brooder as a coop or colony house for older chicks, slatted roosts (not shown), are placed on the false bottom and spring 39 adjusted to secure any capacity, great or small. When it is desired to use the device merely as a house for hens and baby chicks, the spring 39 is removed. These features, however, I have deemed it unnecessary to illustrate.

While I have shown and described one form of my invention, it is to be understood that I am not limited to the details or the form or relative arrangement of parts disclosed, but that modifications may be made therein, without departing from the spirit thereof.

Having described my invention, what I claim and desire to secure by Letters-Patent, is:

1. A device of the character described, comprising a coop having an entrance opening in its front wall and shallow sockets in the forward portion of its bottom; a vertically-movable false-bottom in the coop, provided with pins seated in said sockets; a soft lining connected to the false-bottom and the upright walls of the coop and forming with the latter a dead-air space and having a tubular portion disposed in the entrance opening of the coop; an open frame snugly arranged in said tubular portion of the lining and securing the same against the wall of the entrance opening; means for yieldingly supporting the false-bottom; a door pivoted at an intermediate point of its length to swing vertically alongside the front wall of the coop and having a transverse aperture in its rear arm and also having a soft section in the lower portion of its forward arm; a spring strip having an upwardly-disposed portion arranged under the rear portion of the false-bottom; a spring-pressed pin extending through the front wall of the coop and adapted to enter the transverse aperture in the rear arm of the door; a connection intermediate said spring-strip and pin; and a keeper arranged on the front wall of the coop at the opposite side of the entrance opening with reference to the pivot point of the door.

2. A device of the character described, comprising a coop having an entrance opening in one of its upright walls and provided with a movable bottom; means for closing the entrance opening; means for maintaining said closing means from before the entrance opening; means for releasing the closing means automatically to close the entrance opening when there is sufficient weight imposed on the movable bottom; a soft lining connected to the movable bottom and the upright walls of the coop and forming with the latter a dead-air space and having a tubular portion arranged in the entrance opening; and an open frame arranged in said tubular portion and snugly securing the same against the wall of the entrance opening.

3. A device of the character described, comprising a coop having an entrance opening in one of its upright walls and provided with a movable bottom; means for closing the entrance opening; means for maintaining said closing means from before the entrance opening; means for releasing the closing means automatically to close the entrance opening when there is sufficient weight imposed on the movable bottom; and a soft lining connected to the movable bottom and the upright walls of the coop and having an opening communicating with the entrance opening of the coop and also having its portion adjacent its opening connected with the coop wall in which the entrance opening is formed.

4. A device of the character described, comprising a coop having an entrance opening in one of its upright walls; a vertically-movable false-bottom bearing at its forward portion on the bottom of the coop; yielding means supporting the rear portion of said false-bottom; a door pivoted at an intermediate point of its length to swing vertically alongside the coop wall in which the entrance opening is formed and having a transverse aperture in its rear arm and also having a soft section in the lower portion of its forward arm; a spring strip having an upwardly-disposed portion arranged under the rear portion of the false-bottom; a spring-pressed pin extending through said upright wall of the coop and adapted to enter the transverse aperture in the rear arm of the door; and a connection intermediate said spring-strip and pin.

5. A device of the character described, comprising a coop having an entrance opening in one of its upright walls; a movable bottom in the coop; a gravitating door connected with the coop and having its lower portion cut away and also having a section of soft material attached to it and occupying the space left by said cut away portion, and means for releasing the said door on depression of the movable bottom.

In testimony whereof I have hereunto set my hand in presence of two subscribing witnesses.

ISAAC J. PLOUGHE.

Witnesses:
McCLELLAN WAGY,
G. M. STEWART.

Copies of this patent may be obtained for five cents each, by addressing the "Commissioner of Patents, Washington, D. C."